(12) United States Patent
Williams

(10) Patent No.: US 7,017,937 B2
(45) Date of Patent: Mar. 28, 2006

(54) DOUBLE OCCUPANCY BABY STROLLER

(76) Inventor: Michael D. Williams, 491 Gilham Rd., Roanoke, AL (US) 36274

( * ) Notice: Subject to any disclaimer, the term of this patent is extended or adjusted under 35 U.S.C. 154(b) by 174 days.

(21) Appl. No.: 10/695,861

(22) Filed: Oct. 30, 2003

(65) Prior Publication Data
US 2005/0093259 A1    May 5, 2005

(51) Int. Cl.
*B62B 7/06*    (2006.01)
(52) U.S. Cl. ............ 280/643; 280/657; 280/47.35; 280/642; 280/30; 280/639; 280/47.38
(58) Field of Classification Search ......... 280/657, 280/568, 642, 643
See application file for complete search history.

(56) References Cited

U.S. PATENT DOCUMENTS

| RE6,657 E | | 9/1875 | Daby | |
|---|---|---|---|---|
| 264,955 A | * | 9/1882 | Johnson | ............ 362/476 |
| 2,539,236 A | * | 1/1951 | Dore | ............ 280/47.35 |
| 3,967,833 A | | 7/1976 | Fleischer | |
| 4,678,196 A | | 7/1987 | Van Steenburg | |
| 4,828,281 A | | 5/1989 | Sanchas | |
| 4,878,680 A | | 11/1989 | Molnar | |
| 4,896,894 A | | 1/1990 | Singletary | |
| 5,104,134 A | | 4/1992 | Cone | |
| 5,318,311 A | | 6/1994 | Bofill | |
| 5,360,221 A | | 11/1994 | Chai | |
| 5,398,951 A | | 3/1995 | Ryu | |
| 5,478,096 A | | 12/1995 | Ting | |
| 5,823,547 A | * | 10/1998 | Otobe et al. | ............ 280/30 |
| 5,947,555 A | * | 9/1999 | Welsh et al. | ............ 297/130 |
| 6,286,844 B1 | * | 9/2001 | Cone et al. | ............ 280/47.41 |

FOREIGN PATENT DOCUMENTS

| GB | 2 211 082 A | 6/1989 |
|---|---|---|
| GB | 2 254 587 A | 10/1992 |
| GB | 2 262 914 A | 7/1993 |

* cited by examiner

*Primary Examiner*—Christopher P. Ellis
*Assistant Examiner*—Cynthia F. Collado
(74) *Attorney, Agent, or Firm*—Richard C. Litman

(57) ABSTRACT

A double occupancy baby stroller having a guiding handle and a generally stork shaped body having head and tail sections. The body is separable into an upper portion and a lower portion. A child's seat is removably mounted on the upper portion and wheeled legs are attached to the lower portion. An infant carrier is detachably mounted inside the head of the body. Both child's seat and infant carrier can be effectively used in a vehicle.

10 Claims, 13 Drawing Sheets

DOUBLE OCCUPANCY BABY STROLLER

BACKGROUND OF THE INVENTION

1. Field of the Invention

The present invention relates generally to child and baby strollers. More specifically, the present invention is a baby stroller in the shape of a stork having a baby carrier in the beak and a seat for a toddler on the back of the stork. In other embodiments the baby carrier and child seat can be used as car seats for the infant and the toddler either joined together or separated. Another embodiment adds a false bottom in the carrier for a bassinet.

2. Description of Prior Art

The related art of interest describes various baby carriers, but none discloses the present invention. There is a need for a bird-like stroller apparatus, which accommodates a child and an infant, and provides separation of various parts. Swan carriages and multi-purpose baby carriers are known in the patent literature, as exemplified by the following patents, but none discloses the safe carrying of a child and an infant on one stroller with the advantages of either (1) placing an upper half of the stroller in a car as the child's car seat, and disengaging the infant carrier to place the carrier in the car as a second car seat, or (2) removing the child's seat from the upper half and removing the infant carrier to place both in the vehicle as safety seats, and (3) storing the remaining parts of the infant stroller in the rear storage area of the vehicle. An additional embodiment converts the stroller to a bassinet with a false bottom.

U.S. Reissue Pat. No. 6,657 issued on Sep. 28, 1875, to A. W. Daby describes a children's carriage having a shape of a swan with a canopy and rear handle supported by sills resting on a pair of ornate springs attached to the axles. The carriage is distinguishable for its requirement for spring action.

U.S. Pat. No. 2,539,236 issued on Jan. 23, 1952, to Evelyn Dore describes a bird-shaped baby carriage with two folding seats, which face each other in the body cavity. The carriage has a bird head with a hollow neck for storing items, large wings, a rear handle decorated with small birds, and angularly bent legs resting on the chassis frame supported by four wheels. The carriage is distinguishable for its required folding opposed seats.

U.S. Pat. No. 3,967,833 issued on Jul. 6, 1976, to Henry Fleischer describes a portable baby holding device which may take the form of a combination baby carriage, stroller, infant seat, car seat, car bed, bassinet, and high chair. The device has a canopy completely covering the baby and a collapsible frame comprising a horizontal primary tubular support having hook-like members angling upward and rearward, i.e., push handle, and supported by an upper cross member and extendible cross members supporting the rear wheels. Front caster wheels support the front portion of the primary tubular support. The device is distinguishable for its required horizontal primary tubular support.

U.S. Pat. No. 4,678,196 issued on Jul. 7, 1987, to Kip Van Steenberg describes a child car seat superstructure apparatus convertible into a stroller comprising a super-structure shell having a pair of longitudinally extending arms, a U-frame rear pusher bar rotatable forward by a rack type positioner, a base frame with four wheels supporting the removable seat and adjustable chair back. The apparatus is distinguishable for requiring a superstructure to accommodate only a single infant.

U.S. Pat. No. 4,828,281 issued on May 9, 1989, to David K. Sanchas describes a convertible car seat to a stroller apparatus comprising a latched together two-piece hollow seat structure having a seat belt on the upper portion across the wings, and openings in the lower portion for the vehicle's seat belt. For forming the stroller, the lower portion is removed to lower the folded perimeter framework supporting four wheels via an inner and outer scissors link. An enclosed U-shaped handle is pivoted upward in the rear. The apparatus is distinguishable for being limited to accommodate one infant and requiring a perimeter frame for the wheels.

U.S. Pat. No. 4,878,680 issued on Nov. 9, 1989, to Terrence O. Molnar describes a convertible car seat and stroller combination apparatus comprising a padded child's seat having a telescopic U-shaped handle extending upward from behind the back of the seat, and a perimeter frame having four wheels extendible downward. The apparatus is distinguishable for being limited to one occupant and requiring a perimeter frame for the wheels.

U.S. Pat. No. 4,896,894 issued on Jan. 30, 1990, to David L. Singletary describes a stroller car seat apparatus comprising a conventional infant seat having a safety harness, a U-shaped padded front guard bar, a U-shaped telescoping handle in the rear, a pivoting front footrest, and a folding rectangular scissors framework with four wheels. The apparatus is distinguishable for being limited to one child and requiring an obtrusive lower framework.

U.S. Pat. No. 5,104,134 issued on Apr. 14, 1992, to Richard E. Cone describes a convertible child's combination car seat and stroller apparatus comprising a molded plastic shell with lower door panels for including a four-wheel assembly on front and rear pivoting legs. The two front wheels can rotate, but the rear wheels are doubled. A telescopic handle is mounted in the shell. The apparatus is distinguishable for being limited to one child and can only be placed on a vehicle seat backwards.

U.S. Pat. No. 5,318,311 issued on Jun. 7, 1994, to Julio A. Bofill describes a combination child vehicle seat and stroller apparatus comprising a hollow chair shaped shell having two telescopic handles with bent handle grips on top of the seatback, two side portions having notches to position the vehicle's seatbelt, and retractable wheel assemblies which form a smooth bottom surface of the apparatus. The apparatus is distinguishable for being limited to a child and requiring retractable wheel assemblies and a pair of telescopic handles.

U.S. Pat. No. 5,360,221 issued on Nov. 1, 1994, to Yoon S. Chai describes a baby carriage convertible to a safety car seat with a harness comprising a body assembly including a seat, a back, a footrest, and side plates. A wheel assembly is pivotally mounted on the body assembly and adapted to be folded back. A handle assembly is pivotally mounted on the body assembly and adapted to be rotated into a horizontal position. A locking assembly locks and releases the wheel assembly. When the carriage is converted into a safety seat, the wheel assembly is released and folded back, and the handle assembly is rotated into a horizontal position to be used as an arm rest plate. The apparatus is distinguishable for being limited to one baby, and requiring the rotation of the handle assembly to serve as an arm rest.

U.S. Pat. No. 5,398,951 issued on Mar. 21, 1995, to Choon W. Ryu describes a convertible child car seat and stroller apparatus comprising a molded plastic safety seat with a forwardly rotatable U-shaped handle, and a collapsible wheel assembly positioned outside the safety seat. The apparatus is distinguishable for being limited to one child and having an exposed folded wheel assembly.

U.S. Pat. No. 5,478,096 issued on Dec. 26, 1995, to Chien Ting describes a collapsible multi-use baby carriage having a structure transformable into a dining chair, a safety seat in a car, a cradle, and a bed comprising a seat, a backrest pivotally connected with the seat to change the angle of the backrest, a U-shaped hand rest pivotally connected with the backrest. The structure has a pushing handle, two opposite telescopic side tubes with a windable support plate between the side tubes, and windable on a winding tubular shaft housed in a front tube of the hand rest for pulling out for supporting food. Two front and rear casters are pivotally connected with the bottom of the seat and foldable to the seat bottom. The carriage is distinguishable for being limited to one infant, and requiring a windable support plate and two opposite side tubes. U.K. Patent Application No. GB 2 211 08 2A published on Jun. 28, 1989, describes an interchangeable infant's seat used as either a car seat or a pram seat comprising a rigid right-angled lightweight chassis left in the car and a pram chassis which accommodates the interchangeable right-angled seat by the car seat belt and clips in the car and by clips in the pram. The device is distinguishable for being limited to one infant and requiring separate car seat and pram supports.

U.K. Patent Application No. GB 2 254 587 A published on Oct. 14, 1992, describes a child seat convertible into a pushchair comprising a seat in a supporting frame adapted to be mounted in a vehicle and on a wheeled frame having releasably mounting parts on each side of the seat and the frame. The carrier is distinguishable for being limited to one infant.

U.K. Patent Application No. GB 2 262 914 A published on Jul. 7, 1993, describes a molded child seat for a vehicle and convertible into a pushchair comprising a supporting frame having two triangular lateral sub-frames interconnected by cross rails. Each sub-frame is equipped with a pair of mounting pins adapted to engage with appropriately shaped and positioned slots on the wheeled pushchair frame. The apparatus is distinguishable for being limited to one infant and requiring a supporting frame.

None of the above inventions and patents, taken either singly or in combination, is seen to describe the instant invention as claimed.

SUMMARY OF THE INVENTION

The present invention is a stork-shaped stroller apparatus for carrying an infant and a toddler. The preferred embodiment has a baby stroller having four separable parts, including an upper body portion, a removable child's seat, a wheeled lower body portion, and a removable infant carrier. The upper body portion comprises a stork's head, upper beak, part of the lower beak, a fixed U-shaped handle behind the stork's head, a seat and a non-folding T-shaped or a U-shaped folding guiding handle for directing the stroller. A pair of footrests is positioned on the sides of the lower body portion for the riding child. Adjacent to a footrest is an aperture for passing a seat belt through the lower body portion to secure the sitting child. The removable infant carrier with a carrying handle is seated within the open stork's beak. The bottom of the carrier is removably secured to the stork's beak by bolts passing through lugs of the infant carrier. The stroller has swiveling doubled front wheels and larger rear wheels with rear wheel brakes for operation by the adult.

Accordingly, it is a principal object of the invention to provide a double occupancy stork-shaped stroller.

It is another object of the invention to provide a double occupancy stork-shaped stroller, which has a detachable infant carrier and a detachable child's car seat.

It is a further object of the invention to provide a stork-shaped double occupancy stroller, which can function as two separable parts with the upper part serving as car seats.

It is still another object of the invention to provide a double occupancy stroller, which has a novel braking device.

It is an object of the invention to provide improved elements and arrangements thereof in a baby carriage for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
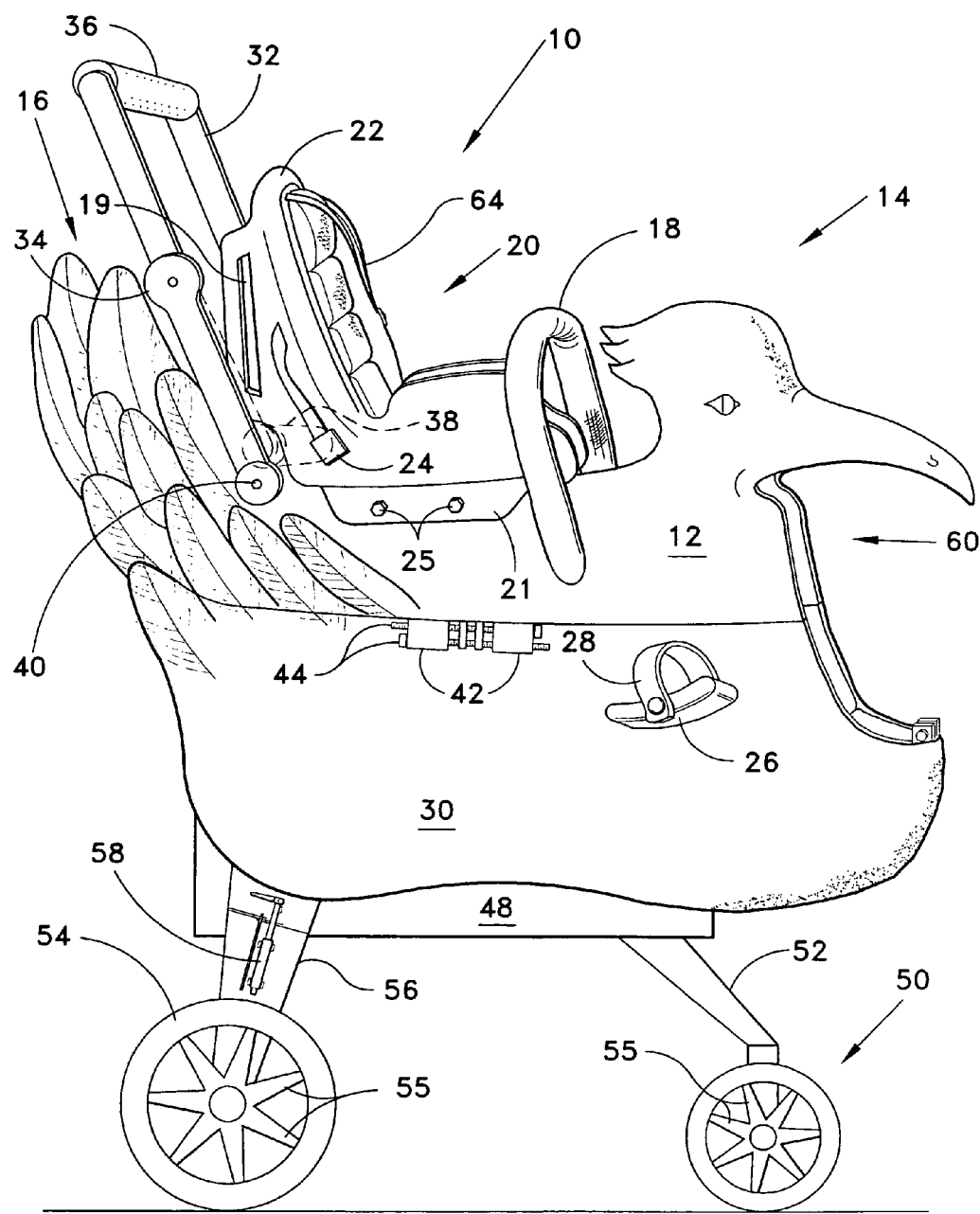
FIG. 1 is a left side perspective view of a double occupancy baby stroller according to the present invention.
Figure 2:
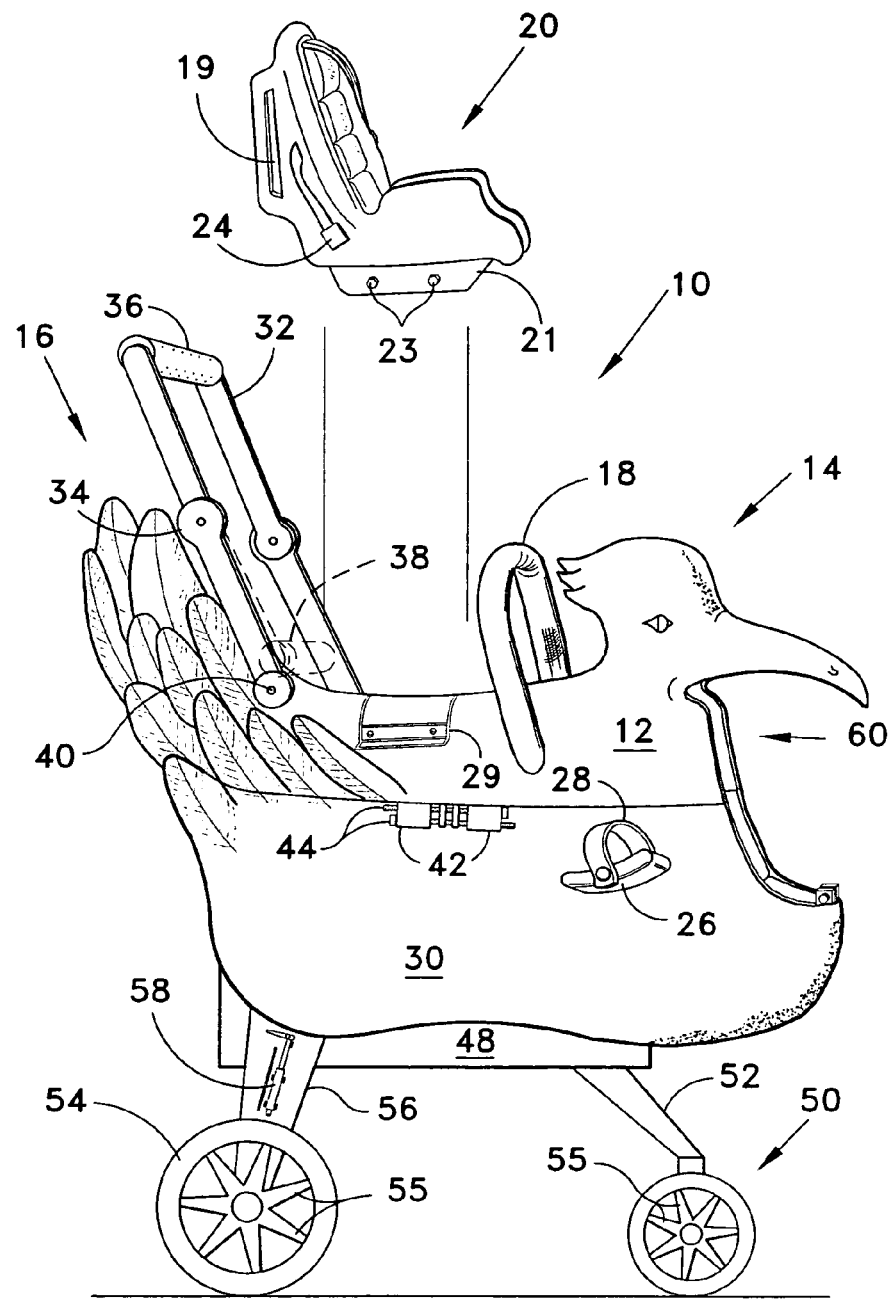
FIG. 2 is an exploded perspective view of the toddler car seat on a top portion of the stroller of FIG. 1.

FIG. 1 (side view) and FIG. 2 (exploded view) illustrate a double occupancy baby stroller according to the present invention having a combined car seat and a stork-shaped stroller apparatus 10 including an upper body portion 12 having a head portion 14 and a tail portion 16. The upper body portion 12 has a U-shaped handle 18 adjacent the head portion 14 which the first child (not shown) can hold while sitting on a removable padded plastic seat 20 and leaning back on the ergonomically shaped padded seat back 22 in front of the tail portion 16. A regular buckled seat belt 24 and a Y-shaped three-piece buckled seat belt 64 are available for the first child fastened on the seat back 22. The seat 20 has elongated apertures 19 on each side of the seat back 22 for fastening the removed seat 20 inside a vehicle with its seat belt. As shown in FIG. 2, the seat 20 has a pair of elongated lugs 21 along its outside bottom sides having a pair of apertures 23 each for fasteners 25 (FIG. 1) to secure the seat 20 to the seat back 22 with aligned lugs 29 (FIG. 2) positioned on the back of the upper body portion 12.

Figure 3:
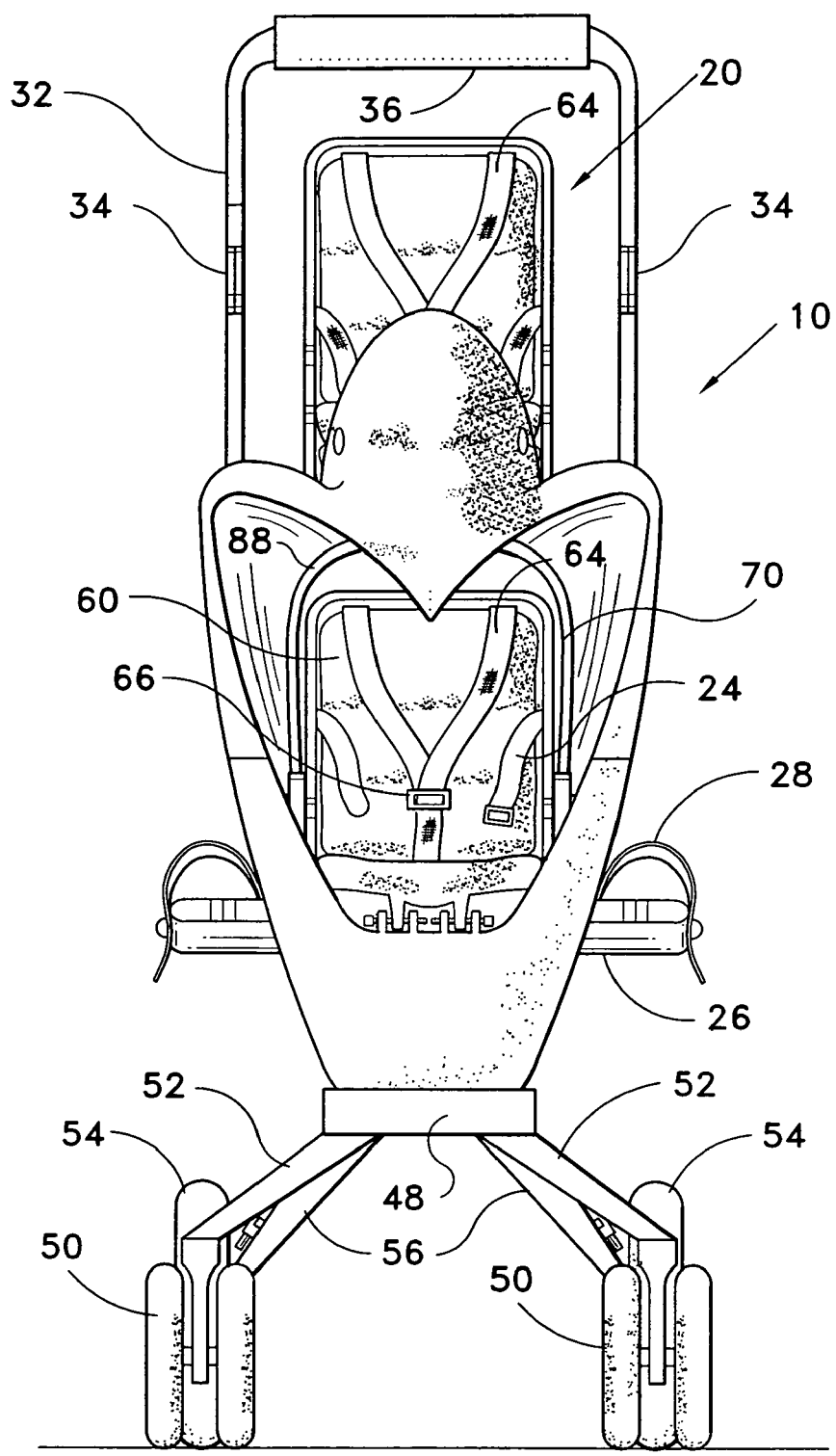
FIG. 3 is a front elevational view of the FIG. 1 baby stroller.

A footrest 26 with a foot strap 28 is positioned on each side of the lower body portion 30 as seen in FIG. 3. A folding U-shaped guide handle 32 having links 34 and a padded handle bar 36 can be folded down as shown in the shadowed position 38 adjacent the pivot pin 40 mounted on the upper body 12 (FIGS. 1 and 2) for placement of the upper body 12 in either the passenger compartment or in the trunk compartment of the vehicle. The body portions 12 and 30 are fastened together by a pair of projecting apertured lugs 46 depending from the bottom edges of both sides of the upper body portion 12 and secured by a pair of fasteners such as bolts 44 to the pair of projecting apertured lugs 42 aligned on the upper edges of the lower body portion 30 between the lugs 46. The separation of the upper body portion 12 from the lower body portion 30 permits an alternate use in a vehicle as mentioned above.

The upper body portion 12 and lower body portion 30 are preferably covered with a stain-resistant fabric or plastic layer over a layer of dense foam padding based on a metal or plastic shell. The lower body portion 30 has a rectangular, box-shaped base 48 supporting the smaller front pair of seven-inch diameter swiveling double wheels 50 on front legs 52. A pair of larger eight- to nine-inch diameter rear wheels 54 with spokes 55 (FIGS. 1 and 2) are supported by back legs 56 having brake units 58 (to be explained fully in FIGS. 7 and 8) for both wheels 54 positioned on the rearward facing outside surfaces of the legs 56.

With reference to FIG. 3, a fixed padded baby seat 60 is positioned in a seat carrier 70 (discussed more fully below) in the open beak of the head portion 14, wherein an infant (not shown) can be securely confined by a Y-shaped harness 64 having an adjustable buckle 66. The harness 64 is attached to the top and bottom portions of the seat 60. An additional buckled seat belt 24 is added.

Figure 4:
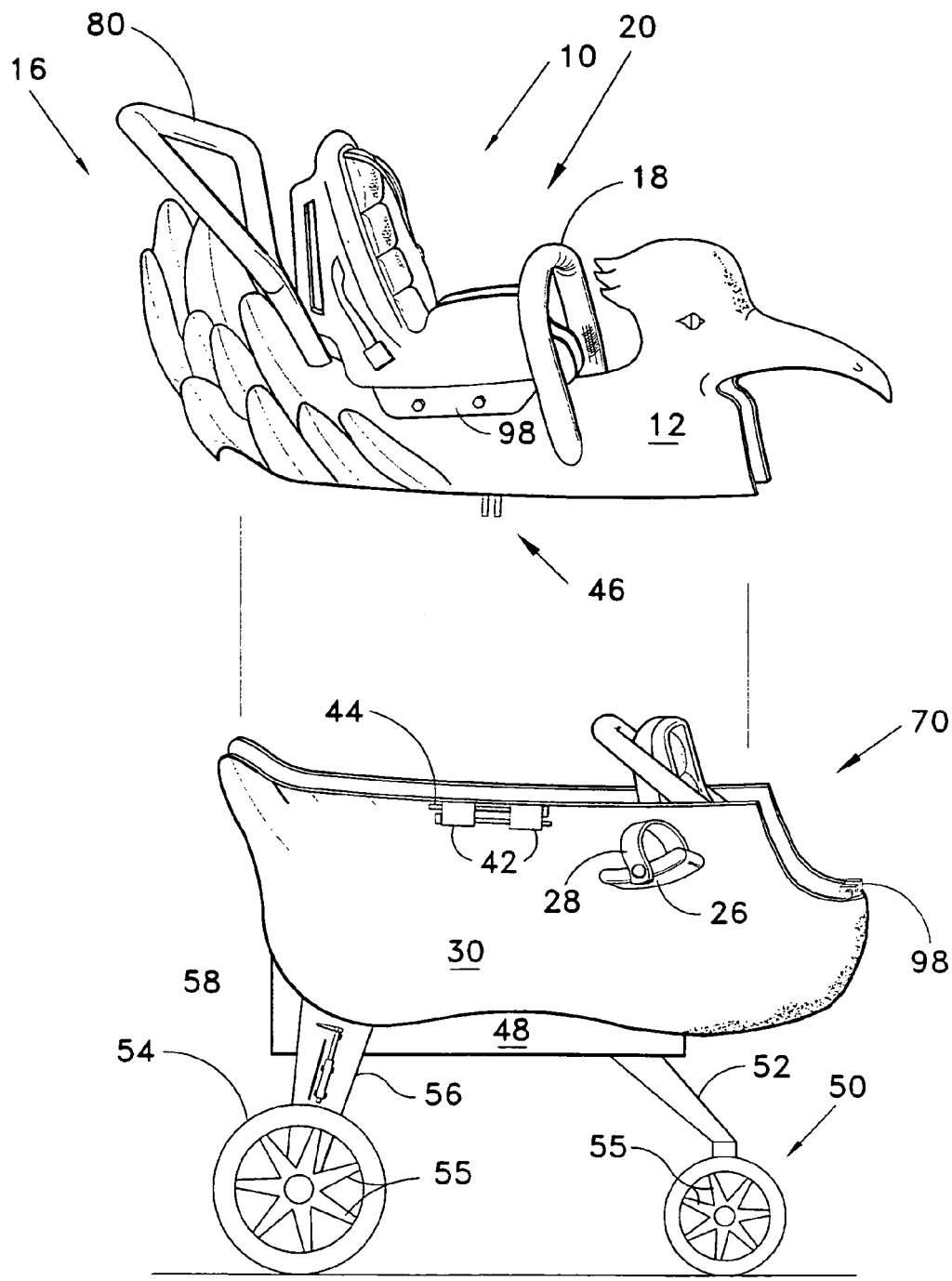
FIG. 4 is an exploded view of the FIG. 1 baby stroller with the top portion detached, and having an alternative triangular shaped guide handle.

FIG. 4 shows the double occupancy stroller 10 with its top body portion 12 removed from its bottom body portion 30. The top portion 12 is connected by a pair of bolts 44 attached to the bottom portion 30 which thread through a pair of lugs 46 attached to the top portion. It is well within the ability of one skilled in the art to substitute additional attachment devices including, straps, snaps or buckles. Once the top portion 12 has been removed, the seat carrier 70 can be easily accessed and removed. An optional triangular handle 80 is attached to the top body portion 12.

Figure 5:
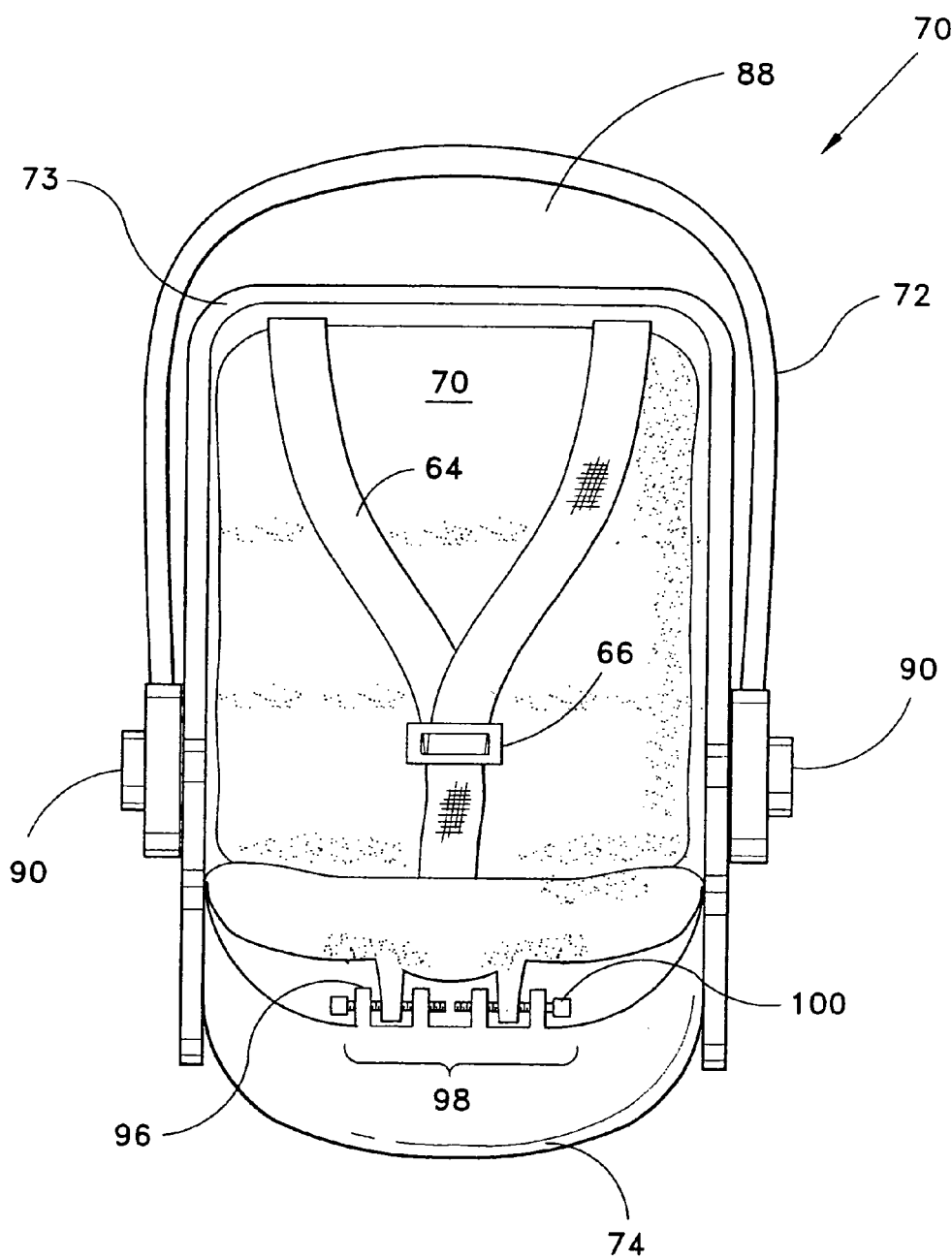
FIG. 5 is a side view of the infant carrier.
Figure 6:
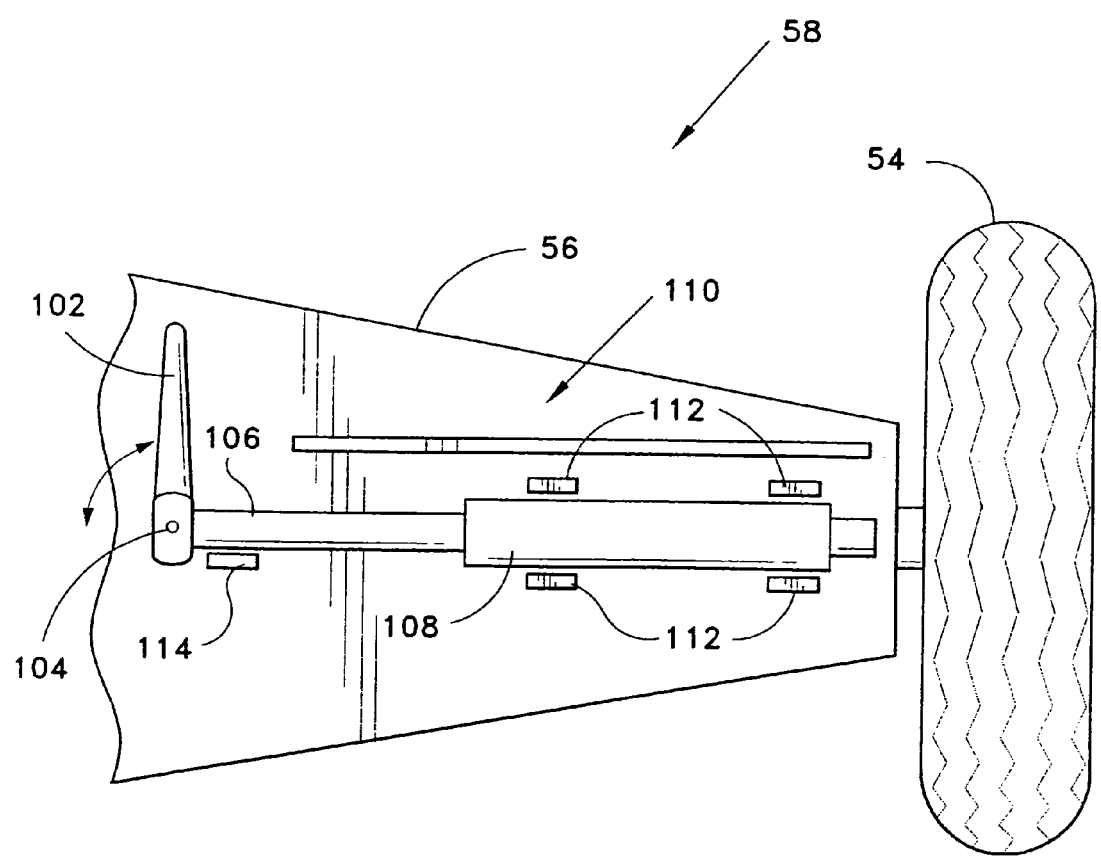
FIG. 6 is a front view of the infant carrier.

FIGS. 5 and 6 show the removable infant carrier 70. The carrier 70 is depicted having an adjustable Y-shaped harness 64 having two shoulder straps and an adjustable buckle 66. A looped carrying handle 88 has a pair of two-position locking dials 90 to secure the handle 88 either in a folded or upright carrying position. FIG. 5 also shows a pair of apertures 92 on each side of the infant seat carrier 70 for inserting the vehicle's seat belt according to the infant's size. Threaded apertures 94 in the lug portions 96 extending from the carrier 70 (FIG. 5) are placed in registry with the apertures defined by a plurality of threaded stroller lugs 98 (FIG. 6) extending from the lower body 30 to accept threaded bolts 100 to secure the carrier 70 to the lower body 30.

Figure 7:
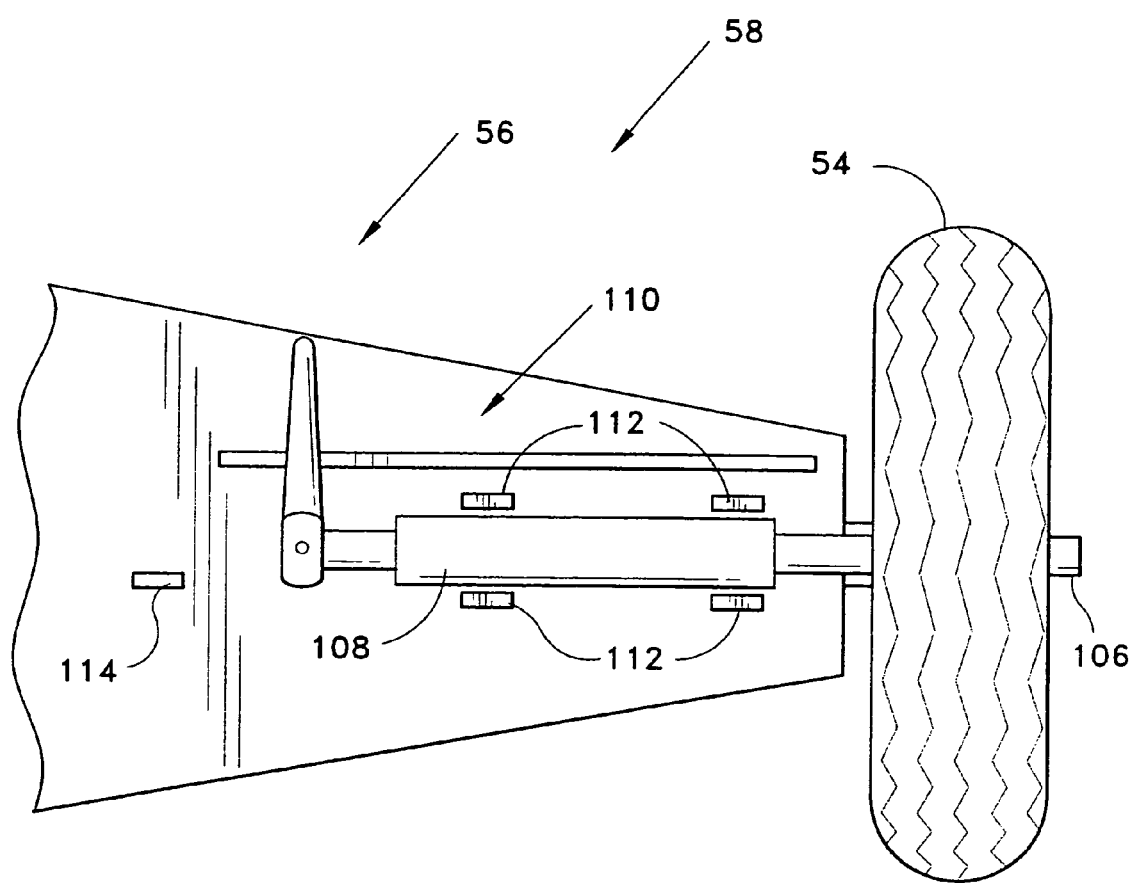
FIG. 7 is a top plan view of a braking mechanism on a rear leg in the retracted position.
Figure 8:
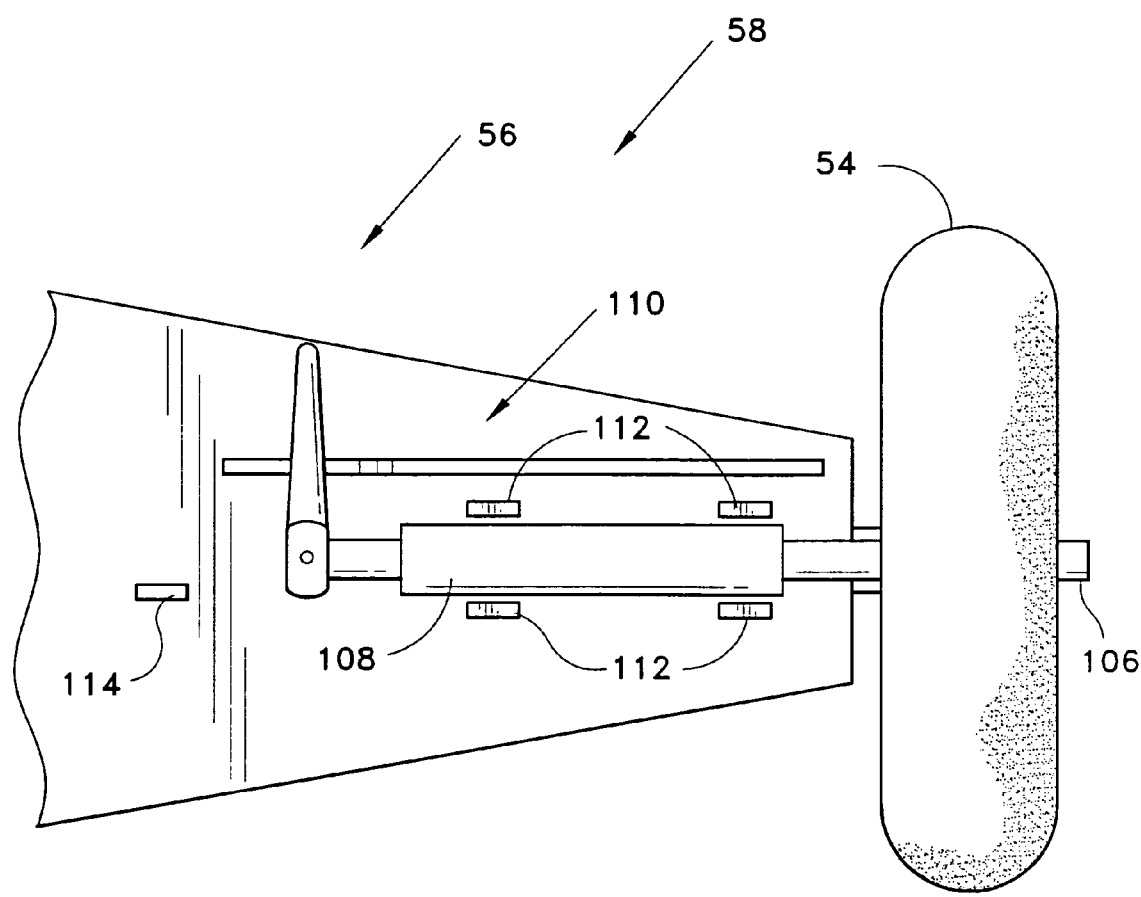
FIG. 8 is a top plan view of the braking mechanism of FIG. 7 in an extended position penetrating the spoked rear wheel.
Figure 9:
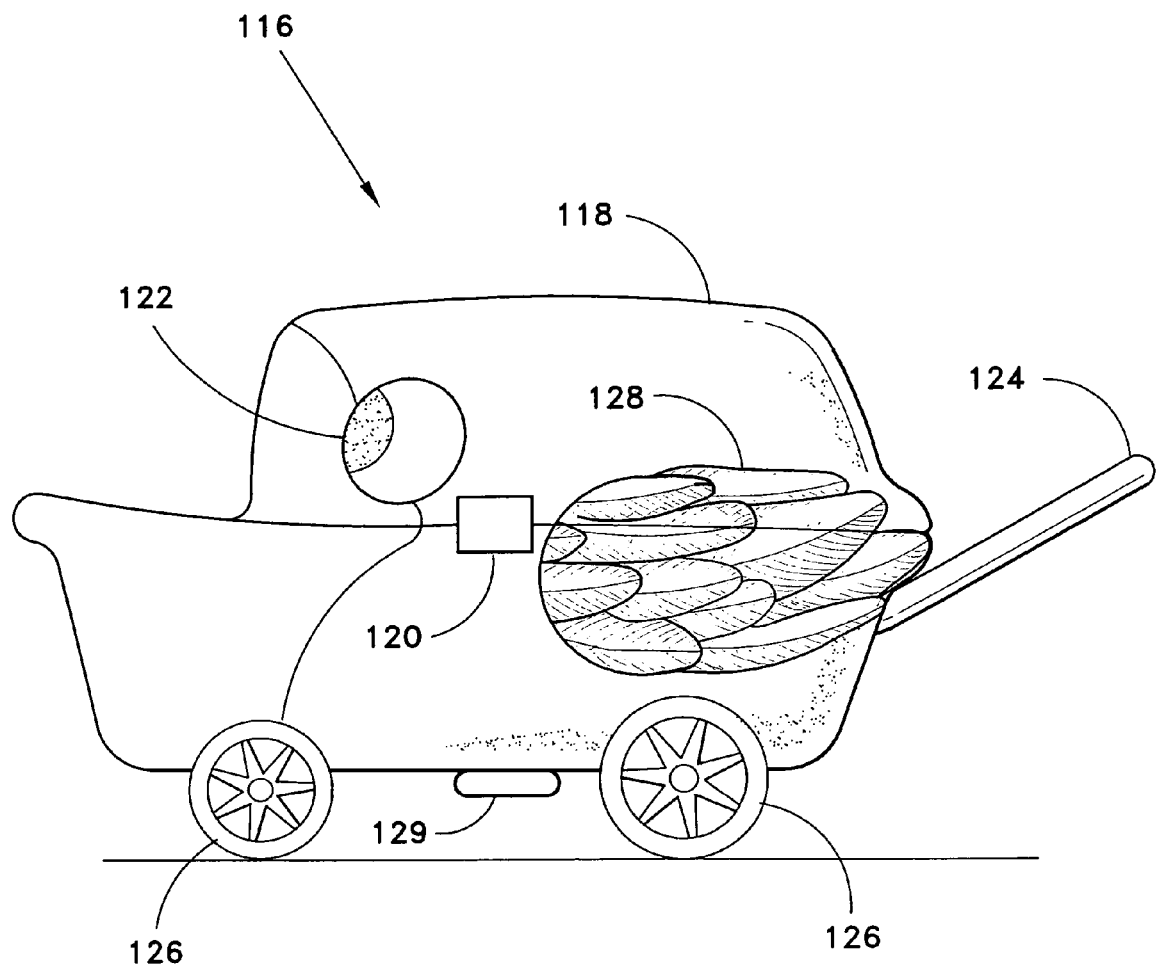
FIG. 9 is a side elevational view of a second embodiment of a simplified single baby carriage containing a bassinet.

In FIGS. 7 and 8, one of the two brake units 58 (the brake unit on the opposite side of the stroller being a mirror image) is illustrated in the non-braking mode and braking mode, respectively. The brake unit 58 is located on the outside surface of the rear leg 56. A rubberized foot operated pedal 102 is held by a set screw 104 onto the end of a cylindrical metal shaft 106 slidable and rotatable in tubular housing 108 which is secured by welding to the metal rear leg 56, or more particularly, to U-shaped brackets 112. The shaft 106 has a length sufficiently adequate to penetrate and hold one of the open portions of the rear wheel 54. An elongated metal ridge 110 for aiming and guiding the pedal 102, and hence the shaft 106, is welded in a forward position. A stop 114 is positioned opposite the ridge 110 and adjacent the pedal 102 to support the shaft 106 when in the retracted position, and to prevent rod 106 from accidentally sliding to the extended position and applying the brake prematurely. When the pedal 102 is pushed and rotated forward by the operator's foot, the shaft 106 can be forced through one of the openings between the spokes in the rear wheel 54 as illustrated in FIG. 8. One or both brake units 58 can be actuated by preference of the operator to prevent the stroller 10 from moving.

Figure 10:
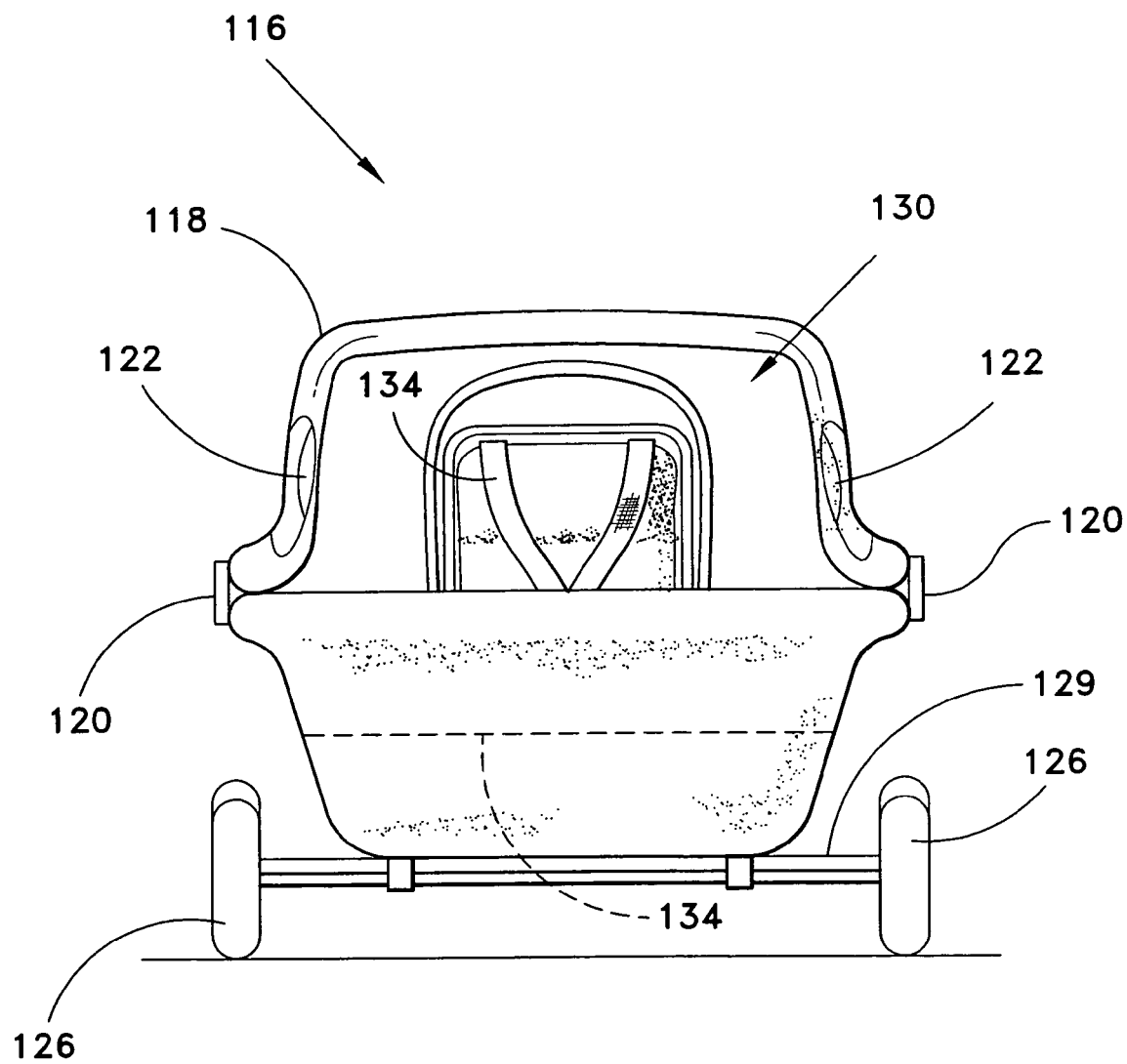
FIG. 10 is a front elevational view of the FIG. 9 carriage.
Figure 11A:
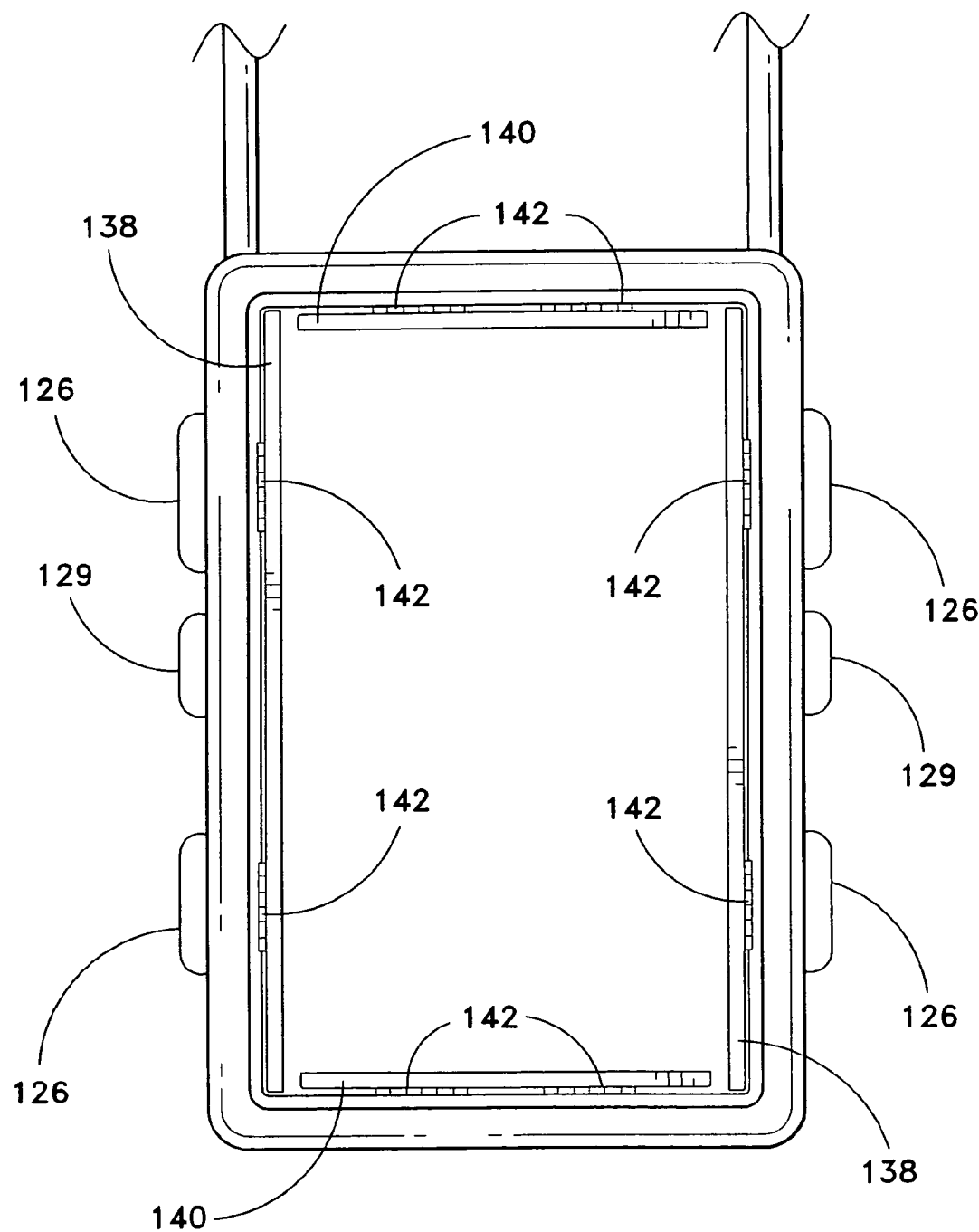
FIG. 11A is a top plan view of the carriage having four hinged floor panels of a false floor in the open position.
Figure 11B:
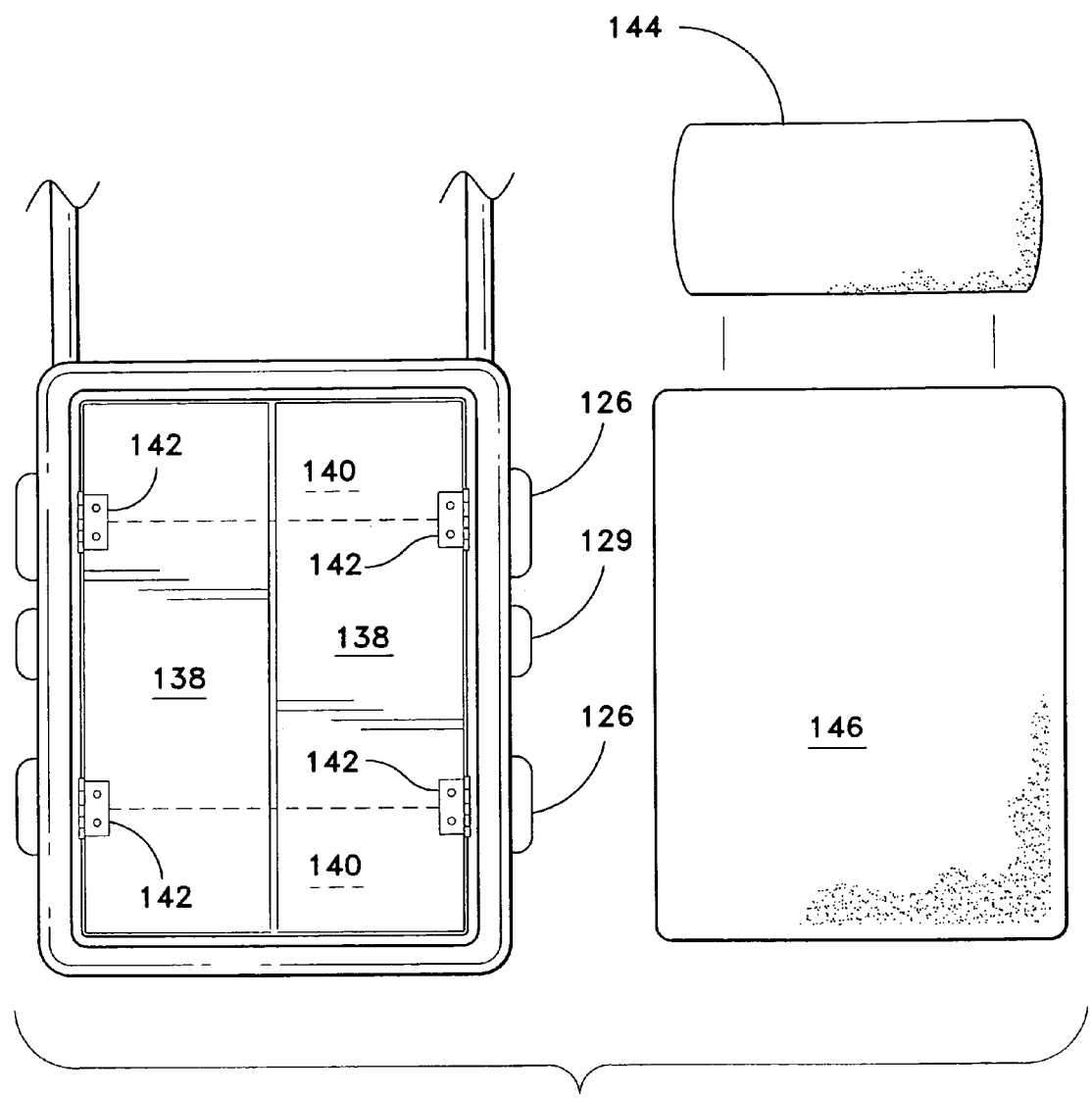
FIG. 11B is an exploded top plan view of the FIG. 11A carriage with the four hinged panels down to form a false floor and including a pillow and a mat.
Figure 11C:
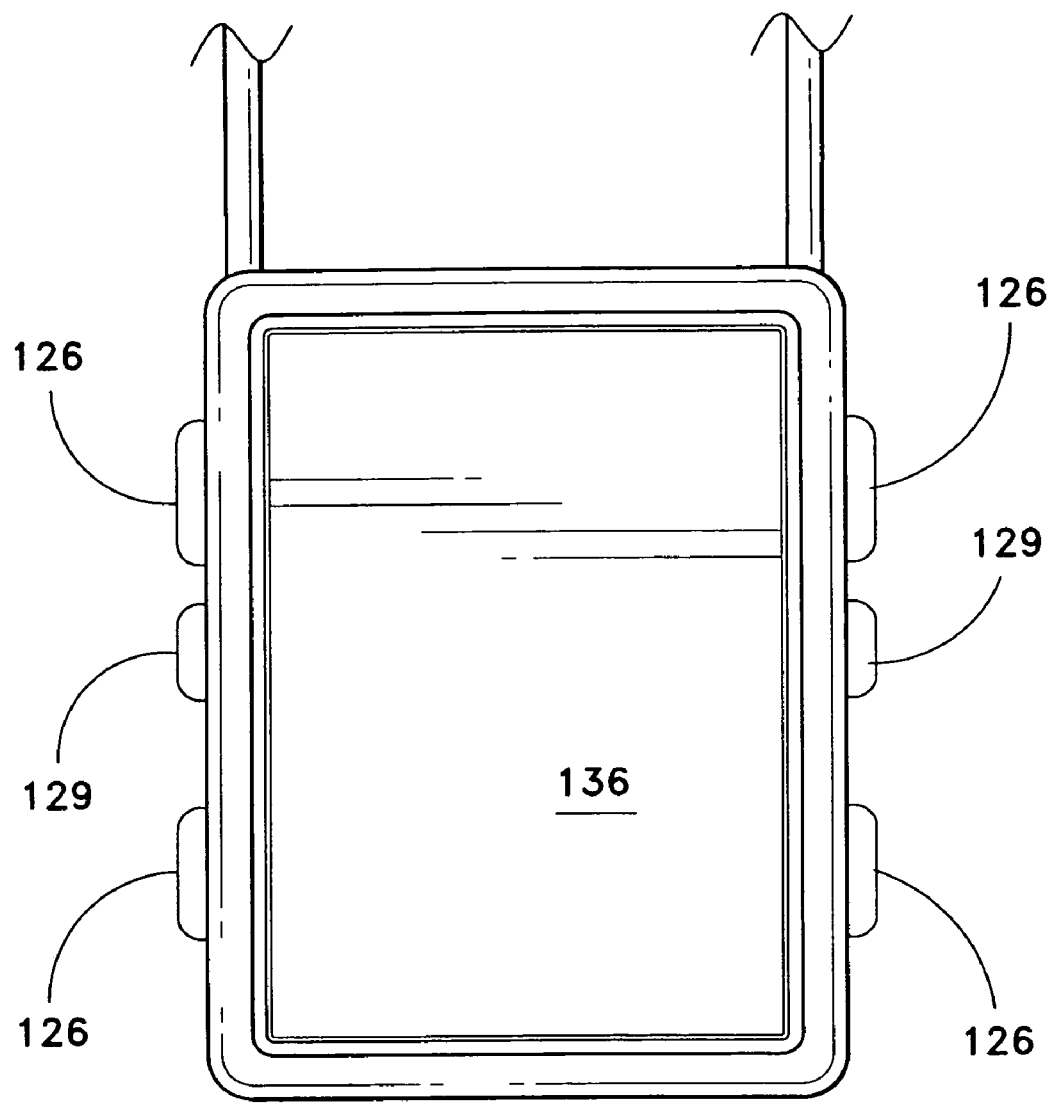
FIG. 11C is a top plan view of an alternative second embodiment of the FIGS. 9 and 10 baby carriage having a single element for a false floor.

FIGS. 9, 10, and 11A to 11C are directed to a simplified baby carriage 116 having a removable hood 118 by unfastening the fastener 120 on both sides of the carriage 116. The hood 118 is decorated with large false eyes 122 on both sides. A loop handle 124 is attached on the rear of the carriage 116 rolling on four wheels 126. A swan wing design 128 is added to each side of the carriage 116. A pair of foot bars 129 are located on the sides of the carriage to enable children to climb into the carriage when the hood 118 is removed. FIG. 10 reveals a child's car seat and carrier 130 with a safety harness 132 which is firmly attached to a segmented false floor 134 shown in FIGS. 11A (opened) and 11B (closed) or an integral false floor 136 shown in FIG. 1C. The segmented false floor 134 comprises two longitudinal panels or flaps 138 and two front and rear panels or flaps 140 having a pair of hinges 142 on each panel for opening the panels upward. In FIG. 11B, a pillow 144 and a padded mat 146 are added for comfort.

The carriage 116 thus serves as a play wagon and a bed. The flaps or panels 138 and 140 are preferably made of either rigid plastic, fiberglass, or steel.

Thus, several embodiments have been shown for enabling the use of the carriage as a car seat and as a bed.

It is to be understood that the present invention is not limited to the embodiment described above, but encompasses any and all embodiments within the scope of the following claims.

I claim:

1. A double occupancy baby stroller comprising:
    a stork-shaped body having an open beak, the body having an upper body portion and a lower body portion, the upper and lower body portions being separable;
    an infant carrier removably disposed inside said open beak;
    a child seat removably disposed upon said upper body portion;
    a steering handle disposed behind said child's seat;
    connection means for joining said upper body portion and lower body portion;
    two front legs and two back legs, each having proximal and distal ends, with the proximal ends being disposed upon the lower body portion;
    at least four open spoked wheels, one said wheel being disposed upon the distal end of each said leg; and
    at least one brake unit disposed upon at least one said back leg.

2. The double occupancy baby stroller according to claim 1, wherein:
    the stork-shaped body portion comprises a hollow metal shell covered by a stain-resistant fabric or plastic layer over a layer of dense foam padding.

3. The double occupancy baby stroller according to claim 1, wherein:
the steering handle is U-shaped, jointed and foldable.

4. The double occupancy baby stroller according to claim 1, wherein:
the steering handle is generally Y-shaped.

5. The double occupancy baby stroller according to claim 1, further comprising:
a safety strap disposed upon said child seat; and
a safety strap disposed upon said infant carrier.

6. The double occupancy baby stroller according to claim 1, further comprising:
two foot rests disposed upon said lower body portion;
two foot straps disposed upon said foot rests; and
a second handle disposed upon the upper body portion.

7. The double occupancy baby stroller according to claim 1, wherein the foldable stroller handle has a rotatable link.

8. The double occupancy baby stroller according to claim 1, further comprising:
a first pair of tugs depending from said upper body portion;
a second pair of lugs on said lower body portion; and
a bolt extending through said first and second pair of lugs.

9. The double occupancy baby stroller according to claim 1, wherein said brake system comprises:
a guide tube attached to each said rear leg;
a rod having a first end and a second end, said rod being slidable and rotatable within said guide tube;
a brake pedal attached to the first end of said rod; and
a stop attached to each said rear leg;
wherein said rod is slidable between an extended position in which said rod extends through the open-spoked wheel in order to brake the stroller, and a retracted position in which said rod is withdrawn from the open spoked wheel and said brake pedal is lodged behind said stop in order to permit free rotation of the open spoked wheel.

10. A double occupancy baby stroller comprising:
a stork-shaped body having an open beak, the body having an upper body portion and a lower body portion, the upper and lower body portions being separable;
an infant carrier removably disposed inside said open beak;
a child seat disposed upon said upper body portion;
a steering handle disposed behind said child's seat;
connection means for joining said upper body portion and lower body portion;
two front legs and two back legs, each leg having proximal and distal ends, with the proximal ends being disposed upon the lower body portion;
four open-spoked wheels, one said wheel being disposed upon the distal end of each said leg;
at least one brake unit disposed upon at least one said back leg;
a safety strap disposed upon said child seat;
a safety strap disposed upon said infant carrier;
two foot rests disposed upon said lower body portion;
two foot straps disposed upon said foot rests; and
a second handle disposed upon the upper body portion.

* * * * *